US010176022B2

(12) United States Patent
Altman et al.

(10) Patent No.: US 10,176,022 B2
(45) Date of Patent: Jan. 8, 2019

(54) DYNAMICALLY ADAPTING A TEST WORKLOAD TO ACCELERATE THE IDENTIFICATION OF PERFORMANCE ISSUES

(71) Applicants: International Business Machines Corporation, Armonk, NY (US); University College Dublin, Dublin (IE)

(72) Inventors: Erik R. Altman, Danbury, CT (US); Hitham Ahmed Assem Aly Salama, Dublin (IE); Nicholas M. Mitchell, Carmel, NY (US); Patrick Joseph O'Sullivan, Dublin (IE); Andres Omar Portillo Dominguez, Dublin (IE); Peter F. Sweeney, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/976,406

(22) Filed: Dec. 21, 2015

(65) Prior Publication Data

US 2017/0177416 A1 Jun. 22, 2017

(51) Int. Cl.
*G06F 9/50* (2006.01)

(52) U.S. Cl.
CPC .................................. *G06F 9/5083* (2013.01)

(58) Field of Classification Search
CPC .................................................... G06F 9/5083
See application file for complete search history.

(56) References Cited

U.S. PATENT DOCUMENTS

| | | | |
|---|---|---|---|
| 6,367,041 B1 | 4/2002 | Statovici et al. | |
| 7,444,263 B2 | 10/2008 | White et al. | |
| 7,809,369 B2 | 10/2010 | Parmar et al. | |
| 8,174,996 B2 | 5/2012 | Omar | |
| 8,276,123 B1 | 9/2012 | Deng et al. | |
| 8,534,839 B2 | 9/2013 | Meuse et al. | |
| 8,627,147 B2 | 1/2014 | Masser et al. | |
| 8,726,243 B2 | 5/2014 | Nasuto et al. | |
| 2002/0087282 A1* | 7/2002 | Millard | G06F 11/3414 702/108 |
| 2012/0049881 A1 | 3/2012 | Johnson et al. | |
| 2014/0019093 A1* | 1/2014 | Masser | G06F 11/3414 702/186 |
| 2014/0101309 A1* | 4/2014 | Guminy | H04L 43/0817 709/224 |

OTHER PUBLICATIONS

"IBM Tivoli Service Management Products Performance Test Best Practices with Rational Performance Tester".*
Horky, V., et al., "Utilizing Performance Unit Tests to Increase Performance Awareness," Department of Distributed and Dependable Systems Faculty of Mathematics and Physics, Charles University, Jan. 31-Feb. 4, 2015, pp. 1-12.

(Continued)

*Primary Examiner* — Sisley N Kim
(74) *Attorney, Agent, or Firm* — Fleit Gibbons Gutman Bongini & Bianco PL; Jon A. Gibbons

(57) ABSTRACT

An improvement to the process for identifying software problems in performance testing is achieved by dynamically adjusting workloads in real-time to stress the functionality of an application suspected of causing a software problem.

17 Claims, 10 Drawing Sheets

(56) References Cited

OTHER PUBLICATIONS

Jin, G., et al., "Understanding and Detecting Real-World Performance Bugs", ACM SIGPLAN Notices, Jun. 2012, pp. 1-11, vol. 47, No. 6.
Xiao, X., et al., "Context-Sensitive Delta Inference for Identifying Workload-Dependent Performance Bottlenecks", International Symposium on Software Testing and Analysis, Jul. 15-20, 2013, pp. 1-11.
Ammons, G., et al., "Exploiting Hardware Performance Counters with Flow and Context Sensitive Profiling", ACM SIGPLAN Notices, May 1997, vol. 32, Issue 5, pp. 1-12.
Hall, R., et al., "Aspect-capable Call Path Profiling of Multi-threaded Java Applications", Proceedings of the 17th IEEE International Conference on Automated Software Engineering, Sep. 23-27, 2002, pp. 1-10.
Compuware, "Application Performance Management Survey, 2007", http://www.cnetdirectintl.com/direct/compuware/Ovum_APM/APM_Survey_Report.pdf, Last retrieved on Nov. 23, 2015, pp. 1-6.

* cited by examiner

Adaptive Workload Feedback Loop

400

410

| Performance Metric Diagnosis Policy | | | |
|---|---|---|---|
| APM | Baseline | Threshold Tolerance | Performance Goal |
| Response Time | 1800 *ms* | + 1000 *ms* | Response Time ≤ 1900 *ms* |
| Throughput | 500 *tps* | - 100 *ms* (400 *ms*) | Throughput MIN 400 *ms* |
| | | | |
| | | | |
| | | | |

| Maximum Workload Adjustment Policy | | | | |
|---|---|---|---|---|
| Transaction | Initial | Delta | Maximum | Total Max |
| Email Reply | 200 | 200 | 1500 | |
| Email Forward | 100 | 150 | 1500 | |
| Search | 150 | 150 | 1500 | |
| | | | | 2,000 |
| | | | | |
| | | 540 | | |

Workload Adjustment Action by Transaction/Functionality

| Email Reply | APM | Performance Goal | Initial | *Delta* | Maximum |
|---|---|---|---|---|---|
| | Response Time | ≤ 1900 *ms* | 250 | 150 | 750 |
| | Throughput | MIN 400 *ms* | 100 | 25 | 1000 |
| | Page Load Time | MIN 400 *ms* | 200 | 50 | 1000 |

| Email Forward | APM | Performance Goal | Initial | *Delta* | Maximum |
|---|---|---|---|---|---|
| | Response Time | ≤ 1900 *ms* | 200 | 100 | 750 |
| | Throughput | MIN 400 *ms* | 100 | 25 | 1000 |
| | Page Load Time | MIN 400 *ms* | 200 | 50 | 1000 |

| Search | APM | Performance Goal | Initial | *Delta* | Maximum |
|---|---|---|---|---|---|
| | Response Time | ≤ 2000 *ms* | 200 | 50 | 750 |
| | Throughput | MIN 600 *ms* | 100 | 25 | 1000 |
| | Page Load Time | MIN 600 *ms* | 200 | 50 | 1000 |

*FIG. 8*

DYNAMICALLY ADAPTING A TEST WORKLOAD TO ACCELERATE THE IDENTIFICATION OF PERFORMANCE ISSUES

BACKGROUND

The present disclosure generally relates to performance testing, and more particularly relates to adapting workloads for use in a performance testing tool.

Performance testing is a complex and time-consuming practice. Every aspect of the design, code, and execution environment of software is influenced by performance. Its pervasive nature makes it a critical dimension of quality, especially at enterprise levels, as it plays a central role in software usability. The latest trends in information technology (such as Cloud computing and Service Oriented Architecture) have added to its complexity.

An example of the complexity of performance testing can be readily appreciated in the context of mail applications such as Gmail™ by Google Inc. Gmail™ involves over 100 transactions—creating emails, reading emails, deleting emails, creating calendar events, deleting calendar events, to name a few. Some transactions include no attachments, some include small, medium, large, very large attachments. Typically, a performance engineer models a workload script to emulate expected behaviors that would likely occur in a production environment. The workload script ideally amplifies the path most frequently traversed (as seen in production runs). For example, folks tend to read more emails that they write emails, and they tend to delete some emails and archive others and forward a few others. Some replied-to emails will be reply-to-all while others will be simply reply-to-author, and other transaction possibilities.

Performance test tools monitor the application performance metrics tied to quality of service objectives, such as average response time, under peak workload conditions. The performance test software observes the behavior of complex workloads, such as the volume of transactions processed by an application per second (tps), requests per second, and page loads per second. Due to the complexity of such workloads, a reliable and replicable deployment is not a simple task.

Performance issues can materialize into serious problems, such as outages in production environments. Assessing these issues is particularly difficult, especially since the problems are often related to the test workloads. These problems are known as workload-dependent performance bottlenecks (WDPBs). WDPBs are commonly caused by workload-dependent loops which contain one or more relatively high-consuming operations, such as file Input/Output (I/O) operations, object creation operations, object destruction operations, and user interface updates.

Techniques exist to identify WDPBs, such as current performance testing tools and performance profiling approaches (e.g., call-tree profiling or stack sampling). However these traditional techniques are inefficient because they rely on static workloads. The performance tester must estimate the size of a workload sufficient to identify performance issues, and that estimated workload does not change throughout a test run, which may span several days. Testers often use "standard" workloads, which are adequate for exposing WDPBs in some functions. However, these standard workloads prove insufficient in some cases to identify WDPBs on small or even relatively large workloads. Moreover, it is often unclear to performance testers how large a workload is large enough for a workload to expose any possible WDPBs.

Incorrect assumption of workloads brings to light two inefficiencies in the current performance testing discipline. First, incorrect workload assumption increases the complexity of performance testing and analysis, indirectly increasing the cost and time required for these activities (commonly limited due to project budget or time constraints). Second, this problem also increases the risk of potentially overlooking performance issues which might have serious business consequences, such as unavailability of services or monetary costs.

IBM® Rational Performance Tester® (RPT) is a leading load testing tool in the industry and works as follows. If a tester wants to use RPT for performance testing of an application (e.g., an IBM Portal® environment), the tester first creates a test script with all the transactions that are of interest (e.g., login, search, and logout) and then specifies a workload (e.g. 200 users) which will be used during the entire testing run. The users for tests of this type are commonly virtual users. Virtual users simulate system activities of an actual user. The available workload pool, often subject to licensing thresholds, or system limits, is a delimiting factor.

However, the workload required to identify performance issues might vary dependent on the application. The workload of 200 users might be insufficient if the same tester needs to evaluate the performance of the IBM Lotus Connections® or the IBM WebSphere® (software suites). Different usage scenarios may require different workloads. As an example, it makes sense to test the commonly-used login/logout functionality with a larger workload than, say a rarely-used functionality.

BRIEF SUMMARY

In one embodiment, a computer-implemented method for dynamically adapting a test workload to expose performance issues in a system under test is disclosed. The system can be a software system including a plurality of applications with associated transactions. The computer-implemented method includes: initializing a diagnosis policy to assess the performance of the system under test, and initializing an adjustment policy for dynamically adjusting a test workload by increasing the number of uses during a test run to stress the functionality of an identified transaction. Parallel to the test run, the computer-implemented method iteratively performs at pre-determined intervals: collecting monitoring data, producing assessment of system performance, identifying possible performance issues, and applying the adjustment policy to increase the number of users in real-time for the transaction suspected of causing the performance issue, while decreasing the number of users for those transactions not exhibiting performance issues.

In a further embodiment, the computer-implemented method the users can be virtual users. Initializing the adjustment policy includes providing an initial workload, a maximum workload, and a delta workload indicating how many additional users to add.

In another embodiment, an information processing system for dynamically adapting a test workload to expose performance issues is disclosed. The information processing system includes memory storing instructions executed by a processor device to perform a method including: initializing a diagnosis policy to assess the performance of the system under test, and initializing an adjustment policy for dynamically adjusting a test workload by increasing the number of uses during a test run, for an identified transaction. Parallel to the test run, the computer-implemented method iteratively performs at pre-determined intervals: collecting monitoring data, producing assessment of system performance, identifying possible performance issues, and applying the adjustment policy to increase the number of users in real-time for the transaction suspected of causing the performance issues, while decreasing the number of users for other transactions not exhibiting performance issues.

In another embodiment, a computer program product for adaptive workload adjustment includes a non-transitory storage medium readable by a processing circuit and storing instructions for execution by the processing circuit for performing a method. The method includes: initializing a diagnosis policy to assess the performance of the system under test, and initializing an adjustment policy for dynamically adjusting a test workload by increasing the number of uses during a test run to stress functionality of an identified application. Parallel to the test run, the computer-implemented method iteratively performs at pre-determined intervals: collecting monitoring data, producing assessment of system performance, identifying possible performance issues, and applying the adjustment policy to increase the number of users in real-time for the transaction suspected of causing the performance issues, while decreasing the number of users for other transactions not exhibiting performance issues.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 illustrates one example of a diagnosis policy, according to one embodiment of the present disclosure;

FIG. 5 illustrates one example of an adjustment policy, according to one embodiment of the present disclosure;

FIG. 8 illustrates one example of a table combining a diagnosis and evaluation policy, according to one embodiment of the present disclosure;

DETAILED DESCRIPTION

Figure 1:
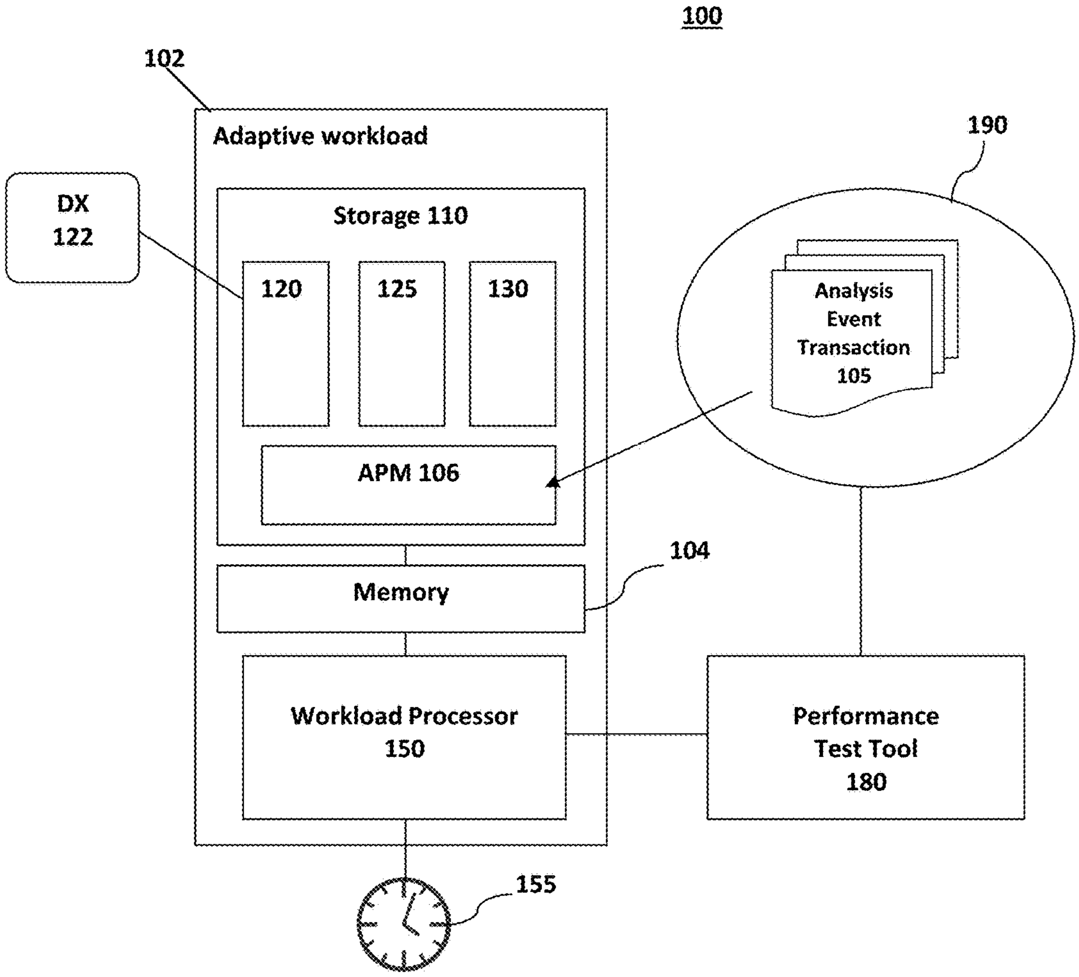
FIG. 1 is a block diagram illustrating one example of an operative environment in which the adaptive workload mechanism is implemented, according to one embodiment of the present disclosure.

Typically, workloads are randomized, meaning that the spirit of the workload intention (e.g. X emails created per hour, Y calendar events created per hour, Z emails deleted per hour, and so forth) is met as per the performance engineer's outset intention, but there is a little randomization in the workload engine to make sure things are not truly deterministic. This means workload 1 does the same as workload 2, but during the run things happen in slightly different orders and slightly different ways—this variability is important because if we optimize a system for a deterministic workload then it will likely fail when things differ (hence randomization).

In accordance with various aspects of the disclosure, a mechanism, system and method is disclosed for expediting the identification of bugs in performance testing by dynamically adapting a workload for use by a performance testing tool. Specifically, one or more embodiments disclose a solution to improve the process of identifying software problems in performance testing by optimizing a randomized workload configuration during a test run, based on its current, changing, testing environment. The workload is adjusted in real-time, according to reported monitoring data, in order to stress the functionality (for e.g. login) of an application and/or system node suspected of exhibiting a performance issue (such as a bottleneck) in order to have more certainty about whether or not a problem exists, whether the problem is a bottleneck, memory leak, CPU spike, deadlock, or response time degradation, to name a few.

The workload adjustment is policy-based, executed according to a set of diagnostic metrics which are monitored and evaluated in real-time to determine if any test workload adjustments are required for the transactions currently under test. Unlike current technologies which rely on static workloads, the adaptive workload method dynamically adapts a workload in real-time for those transactions which are suspected of suffering a performance issue, thus avoiding the need for additional test runs. As part of a workload, virtual users are selectively re-tasked during a test run to stress the functionality suspected of causing the performance issue. This selective re-tasking provides the best use of a workload for identifying bottlenecks.

Adaptive, real-time adjustment of a critical resource (workload) maximizes the results obtained by a performance testing tool, avoiding the need for additional test runs. Improvements in outcomes are realized both in the identification of performance issues (bugs), and in the added certainty regarding the achieved performance goals, as outline in a Service Level Agreement (SLA).

The following is a list of terms and their meanings, as used throughout this disclosure:

Glossary bottleneck—a process in a chain of processes that interferes with the speedy completion of an application call-tree profiling—generating a view of a profiled application that displays function execution paths traversed during a run stack sampling—periodically inspecting the call stacks of all threads.

performance testing—test runs to determine how a system performs under a particular workload workload—a quantitative measure of work performed by one user, expressed as number of users WDPB—workload-dependent performance bottleneck workload intensity—number of concurrent users within a single run performance metrics—measures of application performance, such as response time response time—the length of time taken to respond to a request throughput—maximum number of users served in a given moment synthetic traffic—use of synthetic (virtual) users to model genuine observed network traffic load test—a test of application performance under varying levels of load, such as with 100 users, with 200 users, and so on stress test—a test to uncover the breaking point in an application, to better expose bottlenecks.

virtual user—a computer-generated user as part of a workload policy-driven (also rules-based)—decisions made during a test run are made from a starting point of rules licensing thresholds—a maximum allowed limit on the number and/or usage of virtual users, generally subject to a fee-based license agreement service level agreement—an agreement to provide a certain level of service to an end user synthetic load—tasks generated by virtual users test suite—a collection of test cases

Adaptive Workload Operating Environment

Referring now to FIG. 1, there is shown a simplified illustration of an exemplary operating environment 100 in which the adaptive workload method can be implemented, according to one embodiment. The operating environment 100 includes an adaptive workload system 102 configured to implement policy-driven adaptive workload monitoring, according to an embodiment of the present disclosure. The adaptive workload system 102 can be seamlessly integrated into an existing monitoring infrastructure using known performance test tools 180 and can run parallel to a performance test run.

Although depicted as a stand-alone system in operative communication with a performance test tool 180, various embodiments support a transparent integration of the adaptive workload system 102 into a monitoring framework. For example, it is to be understood that in various embodiments the adaptive workload system 102 functions as part of, or a wrapper around, a performance test tool 180. It will be noted that the adaptive workload system 102 is easily used in tandem with standard, available performance test tools 180, with little or no modification to the performance test tools 180 required. The implementation of the adaptive workload system 102 features efficiency and scalability such that it can be deployed on an Internet scale.

The adaptive workload system 102 includes memory 104 with instructions for performing an adaptive, policy-driven workload adjustment, according to the parameters defined by at least one of: a diagnosis policy 120 and an adjustment policy 125. The adaptive workload processor 150 is operably coupled with the memory 104 and is configured to execute the instructions from memory 104 for performing the adaptive workload method, as disclosed. The adaptive workload system 102 further includes storage 110 configured for storing data as required by the adaptive workload processor 150, including operating instructions. Storage 110 can be configured to include the diagnosis policy 120, the adjustment policy 125, and the configuration file 130. The policies are configured prior to a test run and are activated during a test run. Post-test analysis of the results can produce insights leading to updates to the policies.

In one embodiment, a diagnosis policy 120 specifies transactions of interest to the tester and provides one or more evaluation parameters (instructions, metrics) to determine if a transaction under test is a likely cause of a performance issue. The transactions of interest can be pulled from the test scripts created by the tester for use by the performance test tool 180. The diagnosis policy 120 defines performance goals for any application performance metrics (APMs) 106 that are of interest to a tester. The performance goals can be expressed in terms of business rules tied to a SLA. One can appreciate that the inputs to the diagnosis policy 120 and the adjustment policy 125 are easily generated from the data that is already provided by the tester to the performance test tool 180.

The diagnosis policy 120 can further provide the data sources required to perform the assessment, and any specific input information required by the diagnosis policy 120. In one embodiment, the diagnosis policy 120 specifies an outside evaluation tool 122 to perform a diagnosis on the monitoring data 105, as noted in the discussion regarding FIG. 7.

The monitoring data 105 refers to the performance test data from the monitored system 190 periodically collected by the adaptive workload system 102. The monitoring data 105 is used to identify transactions that may cause a bottleneck, as per the diagnosis policy 120. Performance test tools 180 monitor the APMs 106 tied to quality of service objectives, such as average response time, under peak workload conditions. The performance test software observes the behavior of complex workloads, such as the volume of transactions processed by an application per second (tps), requests per second, and page loads per second. Due to the complexity of such workloads, a reliable and replicable deployment is not a simple task.

In one embodiment, logging points extract raw data (monitoring data 105) from the application or system on which the application is running. Some examples of monitoring data are: a) audit data, such as who and when a configuration parameter of the system is changed; b) transaction (or request) data which measure logical units of work at the application level; c) performance data, such as CPU and memory utilization; d) analytical data, such as page load times for a Web server; and e) event data, such as logging a call to a login service and its return code of success or failure.

For purposes of this disclosure, a system node is any addressable component or process that forms a part of a system under test. A system node can include a server, such as a Web server; a directory such as an LDAP directory; a database; an application; a device such as a printer; and/or a process, to name a few. In a distributed system it is especially advantageous to set multiple logging points across nodes because a failure in one node can cause a performance-degrading condition in another node.

An adjustment policy 125 provides the rules, or guidelines, for adjusting (either increasing or decreasing) the workload for a specific transaction or functionality identified by the adaptive workload system 102 as suspicious (likely to negatively affect performance). An adjustment policy 125 might require any upper and lower workload limits in order to know the workload range within which the adjustment policy 125 might adjust the workload of the tested transactions.

The configuration file 130 can include the configuration specifications for initiating and maintaining the adaptive workload process, as disclosed. For example, the configuration file 130 can include a collection policy specifying the amount of monitoring data 105 to collect and how often. Some examples of configuration parameters are: 1) the sample interval in order to know how frequently the diagnosis policy 120 will be evaluated, 2) indicate which diagnosis and adjustment policies will be used (among the available alternatives), 3) provide the particular inputs required by the chosen policies.

For example, a diagnosis policy 120 might be based on APMs 106 (e.g. response time or throughput) and have as evaluation criterion that any increase above a given response time threshold (over a response time baseline) is considered an abnormal behavior. In this scenario, the tester would need to provide the response time baselines and their respective response time thresholds for the transactions under test. Although only one of each policy is depicted, it will be apparent that various policies specifying different diagnosis and adjustment scenarios, and configurations, can be provided.

The policies guide the performance of the adaptive workload processor 150 in adjusting the workload used by a performance test tool 180 on a monitored system 190 to best identify WDPBs.

The interval timer 155 is operably coupled with the adaptive workload processor 150 and can be embodied as a system clock or global clock. The interval timer 155 is implemented by the adaptive workload processor 150 to schedule test performance data collections at pre-set intervals, as per the stored parameters in the configuration file 130. Once the monitoring data 105 is collected at pre-specified time intervals, the adaptive workload processor 150 analyzes the monitoring data 105 by invoking the diagnosis policy 120 to assess application performance. For example, monitoring data 105 for transactions is collected and analyzed to derive APMs 106 such as average response time and throughput.

Figure 2:
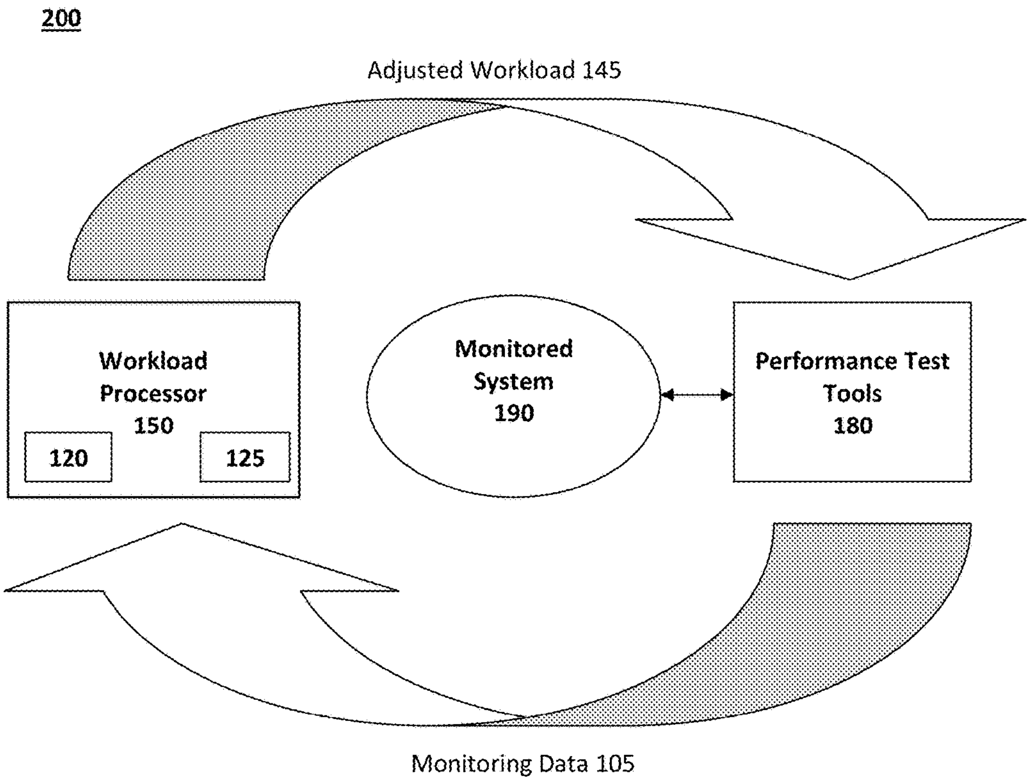
FIG. 2 is a simplified illustration of the adaptive workload feedback loop, according to an embodiment of the disclosure.

Adaptive Workload Feedback Loop—FIG. 2

FIG. 2 shows an adaptive workload feedback loop 200, according to one embodiment. An adaptive workload processor 150 is configured to implement a dynamic workload adjustment method, automatically adjusting the workload 140 used by a performance testing tool 180 on a monitored system 190, based on the system's 190 observed behaviors. The adaptive workload processor 150 implements the adaptive workload method within a running test environment, subject to configuration parameters set out in a diagnosis policy 120 and an adjustment policy 125.

The adaptive workload method can run parallel to the performance test tool 180, leveraging leverages the utility of an existing performance test tool 180 to collect monitoring data 105 from the monitored system 190. The monitoring data 105 is periodically evaluated by the adaptive workload processor 150 to determine if any workload adjustment is required, as per the diagnosis policy 120. If an adjustment is deemed necessary, the adaptive workload processor 150 performs the necessary adjustments to the workload 140 in real-time, according to the adjustment policy 125. The workload adjustment is provided to the performance testing tool 180 which continues its evaluation of the monitored system 190, with an adjusted workload 145.

In accord with various aspects of this disclosure, a workload 140 is increased with the intent of increasing the number of transactions/events to stress a functionality identified as suspicious. We refer to a workload 140 as the number of users; however, one with knowledge in the art will appreciate that a workload 140 represents a number of transactions/events occurring in a system that can be attributable to a user (actual user or virtual user). Therefore, increasing a workload 140 by means other than increasing a number of users is within the spirit and scope of the disclosure.

Assume a tester wishes to gain a better insight into the login functionality and whether or not its performance fulfills the SLA in terms of response time and throughput. Assume licensing thresholds restrict the number of virtual users to 600. In order to optimize the results from a performance testing run, the tester adjusts the initial workload 140 to decrease the number of users for the logout and search functionalities to 50 users each because these transactions are outside of the tester's area of interest. The tester increases the workload 140 for the login transactions to 500 users in order to make better use of those resources by stressing the login functionality.

Figure 3:
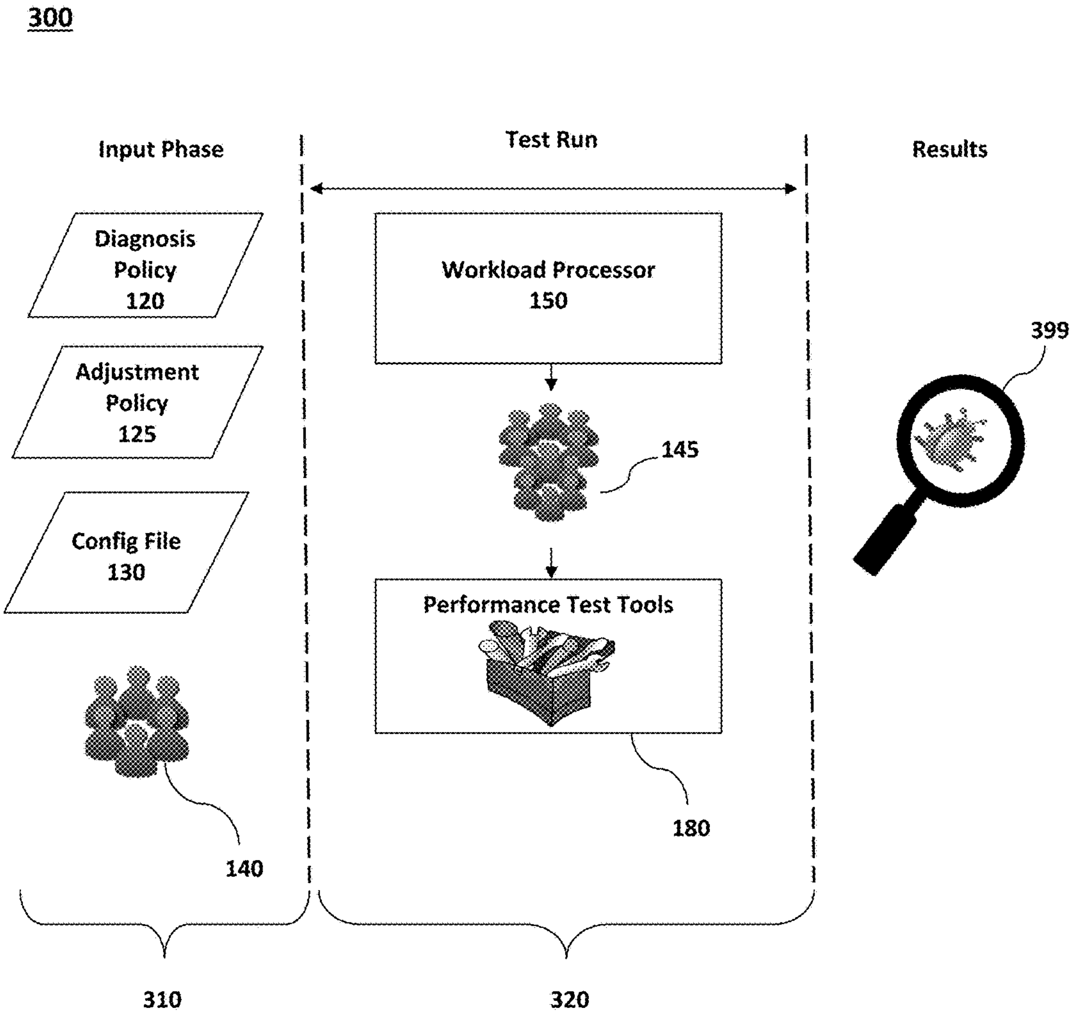
FIG. 3 is a simplified schematic of the adaptive workload process requirements, according to one embodiment of the present disclosure.

Adaptive Workload Process Overview—FIG. 3

FIG. 3 shows a simplified, basic process overview 300 of the adaptive workload method, according to one embodiment. At a minimum, the inputs to the process are: at least one diagnosis policy 120, at least one adjustment policy 125, a configuration file 130, and an initial workload 140. The diagnosis policy 120, adjustment policy 125, and configuration file 130 are depicted as separate blocks for clarity of presentation in order to underscore their use in the adaptive workload method. It is to be understood that the blocks are not to be construed as separate physical, or logical, components. The configuration file 130, for example, can contain the diagnosis policy 120 and the adjustment policy 125.

During the input phase 310 of the process, the tester provides the policies that are applicable to the tester's areas of interest. In one example, the tester submits the policies, perhaps as scripts, prior to the test execution. The configuration parameters are provided, framing the test requirements. An initial workload 140 must be specified prior to the test run 320. In one embodiment, the initial workload 140 is set by the performance test tool 180. In another embodiment, the initial workload 140 is specified in the configuration file 130.

During the test phase 320, the adaptive workload processor 150 evaluates monitoring data 105 from the monitored system 190 and makes any necessary changes to the workload 140. The adjusted workload 145 is provided to the performance testing tool 180 which continues to operate on the monitored system 190, providing monitoring data 105 evaluated by the adaptive workload processor 150. The results of the adaptive workload method are the improved identification of bugs 399, such as WDPBs.

Policy Examples—FIGS. 4 and 5

Different policies can be associated with different performance test tools 180, with different capabilities, parameters, and configuration options. Non-limiting examples of possible policies which can be applicable to a performance testing tool 180 (such as the IBM® RPT tool previously discussed) are:

Performance metric diagnosis policy, as shown in the table 400 of FIG. 4. This policy is based on a set of APMs 106 (such as response time and throughput). Whenever the performance of any transaction exceeds a defined threshold (above an expected baseline), that transaction is considered suspicious, i.e., a likely candidate to suffer a performance issue.

FIG. 4 represents a non-limiting example of a diagnosis policy 120, according to one embodiment. The diagnosis policy 120 of FIG. 4 is presented as a table 400 for clarity of understanding. It will be appreciated that the diagnosis policy 120 can be expressed as a command, or script, or as a look-up table as shown in FIG. 4. Table 400 features performance parameters 410 of APM 106, baseline, tolerance threshold, and performance goal. For example, the baseline for the APM 106 of Response Time is set at 1800 ms. This figure can be derived from past test and/or production runs. According to the example of FIG. 4, the threshold tolerance for the response time metric is an additional 1000 ms, for a performance goal requiring a maximum response time of 1900 ms. A designated application with a response time over 1900 ms is to be identified as a suspect. In this case, the adaptive workload processor 150 triggers an increase in the workload 140 for the suspect application.

FIG. 5 shows a non-limiting example of an adjustment policy 125 for the login, search, and logout functions 510, according to one embodiment. The adjustment policy 125 of FIG. 5 is presented as a table 500 for clarity of understanding. Table 500 features adjustment parameters for directing the adjustment of a workload 140 on a test system 190. As an example, FIG. 5 provides the types of transactions 510 that are of interest to a user, such as login, search, and logout. It will be appreciated that these examples are not comprehensive, and many more types of transactional data can be evaluated within the spirit and scope of the disclosure.

In one embodiment, a tester provides inputs such as: the initial workload 140 to be used (e.g. 200 users); the delta workload, which indicates how much the workload should change whenever an adjustment is required (e.g. 10 users). The delta workload can be provided as an explicit amount (10 users), or as a percentage amount (5%). An additional parameter provided by a tester can be the maximum possible workload 580 that the performance test can use (e.g. 2,000 users), a parameter which would likely depend on the characteristics of the machine where the test loader is executed, as well as licensing limits.

Whenever the adjustment policy 125 is executed, it will increase the workload 140 of those transactions which are suspicious of suffering a performance issue, by increasing the workload 140 by the defined delta, yet without exceeding the maximum allowed workload 580. At the same time, the workloads 140 of the well-behaved transactions (those which are not suspected of suffering a performance issue) are decreased in order to stress the suspicious transactions as much as possible, within the maximum allowed workload 580.

For each type of transaction, table 500 provides the adjustment parameters 540 for an initial workload, a delta workload, and a maximum workload, per transaction 510. Once a transaction 510 is identified by the diagnosis policy 120 as failing to meet a performance goal, the adjustment policy 125 is queried to determine the adjustment parameters 540 for that particular transaction. For example, assume the adaptive workload processor 150 determines that the email reply functionality might be causing a bottleneck, or other performance issue. In that case, the adjustment policy 125 mandates an increase of 200 users to the workload 140, up to a maximum of 1500 users for that functionality. It will be noted that the total of the maximum workload for each of the transactions listed in the example of FIG. 5 adds up to 4,500, more than the total workload maximum 580 of 2,000 users. This is because any workload increase to one transaction will incur a decrease in other transaction.

Supplementary Tool Diagnosis Policy (STDP): This type of policy makes use of supplementary sources 122 (outside the direct control of a performance testing tool 180) to identify suspicious transactions. One example is discussed in the narrative regarding FIG. 7. The STDP must provide the source 122. In one embodiment, the source 122 can be provided in the form of a web address.

It is anticipated that the adaptive workload system 102 will increase its utility over time with continual propagation and calibration of the diagnosis and adjustment policies.

Figure 6:
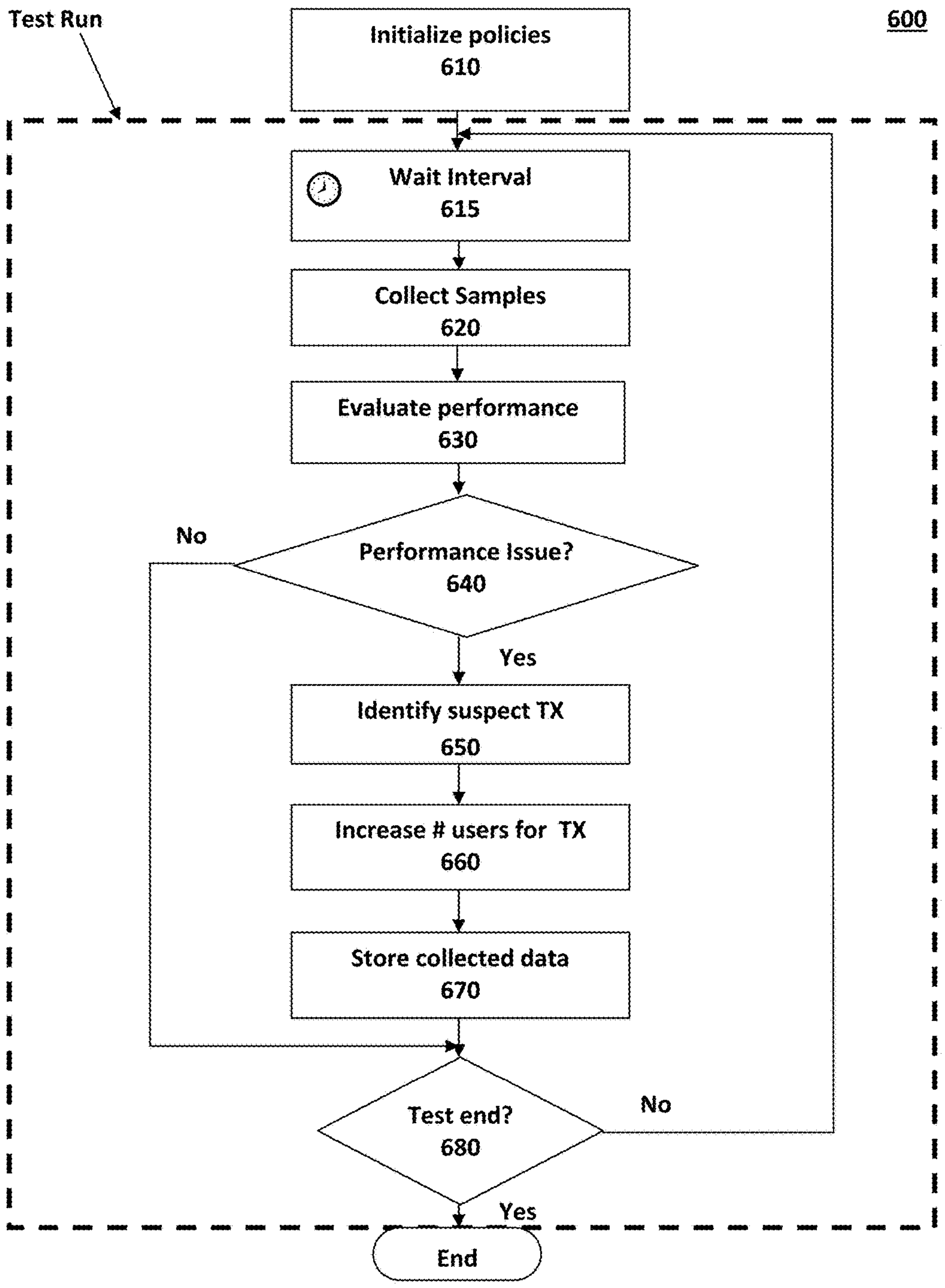
FIG. 6 is an operational flow diagram of the adaptive workload method, according to one embodiment of the present disclosure.

Operational Flow Diagram—FIG. 6

FIG. 6 shows an operational flow diagram 600 of the process for dynamically adapting a workload for a performance testing tool 180, according to an embodiment. The process for dynamically adapting a test workload 140 can run parallel to the performance test run. The operational flow begins prior to the test run, at step 610, by initializing a configuration file 130, as well as at least one each of two different types of policies—a diagnosis policy 120 and an adjustment policy 125.

Once the initialization of the process is complete, the workload adjustment process can run in a loop parallel to the performance test execution. As part of the configuration file 130, a sampling interval time is decided upon so that the application under test has some time to process a certain amount of transactions (as per the current workload conditions) before any diagnosis is attempted. In step 615 the workload adjustment process waits the configured wait time, as set forth in the configuration file 130. After waiting the configured sampling interval time in step 615, a set of monitoring data 105 samples is collected (following the data sources defined by the diagnosis policy 120) in step 620.

After the collection of step 620 is complete, the collected monitoring data 105 is evaluated following the evaluation criteria defined in the selected diagnosis policy 120 in step 630. As part of the evaluation, the adaptive workload processor 150 applies metrics to the monitoring data 105 to derive APMs 106, such as average response time, throughput, and the like.

Transactions or functionality not meeting their performance goals, as stated in the diagnosis policy 120, are considered to exhibit performance issues. If the evaluation in step 630 reports a transaction likely to cause a performance issue, as determined in decision step 640, the suspect transaction(s) is(are) identified in step 650 as likely candidates for causing a WDPB.

Once identified, the applicable adjustment policy 125 is referenced to locate the identified transaction and its associated workload adjustment parameters 540. In step 660 the workload 140 of any suspect transactions is adjusted to an adjusted workload 145, as per the workload adjustment parameters 540 of the matched transaction. The workload adjustment is controlled by the workload adjustment parameters 640 of the selected adjustment policy 125.

For example, assume the evaluation in step 630 uncovered that one login transaction (or a pre-defined threshold of login transactions) was experiencing response times greater than 1900 ms, and that this "suspect" transaction was specified as a transaction of interest in the diagnosis policy 120. The applicable adjustment policy 125 is referenced to determine what action to take by matching the "suspect" transaction with its counterpart in the adjustment policy 125. According to the parameters 540 set forth in the adjustment policy 125, the adaptive workload processor 150 increases the number of users for the login functionality of the matched "suspect" transaction by the specified delta of 50 users.

In step 670 the APMs 106 and are stored for future analysis to enable future updates to the diagnosis policy 120 and the adjustment policy 125 with the insight "learned" from the test runs. In step 680 if the test run continues, then the workload adjustment process loops back to step 615. The process iteratively continues until the performance test terminates.

In summary, by implementing the above inventive steps, the workload adjustment method will be able to dynamically adapt the workload 140 used in a performance testing tool 180 in order to maximize the results of performance testing over a tested system 190.

Figure 7:
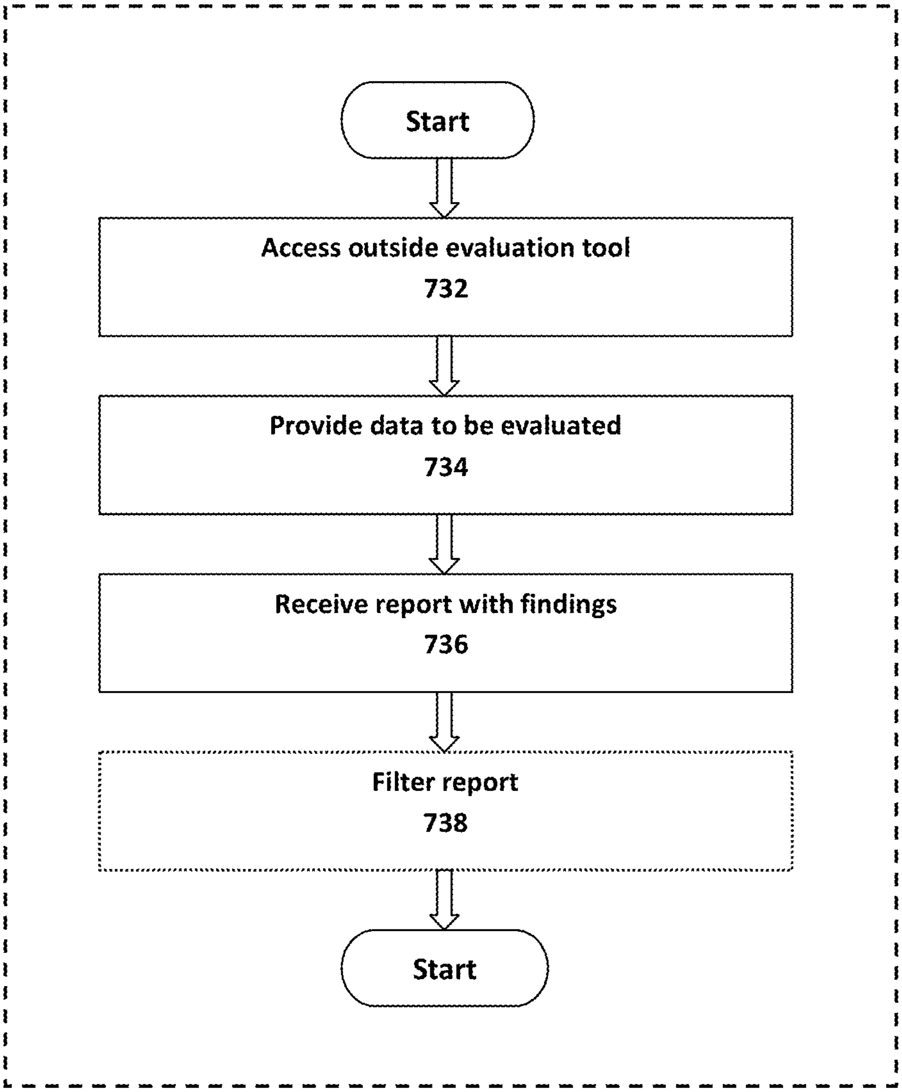
FIG. 7 is an operational flow diagram of the performance evaluation process of the adaptive workload method of FIG. 6, according to one embodiment of the present disclosure.

Operational Flow for Performance Evaluation—FIG. 7

FIG. 7 shows an operational flow diagram 700 of the performance evaluation process 630 from FIG. 6, according to one embodiment, wherein a supplementary evaluation tool 122 outside the direct control of the performance testing tool 180 is employed. Many evaluation tools 122 are available and easy to use in the identification of suspicious transactions. As a non-limiting example, the IBM® Whole-System Analysis of Idle Time tool (WAIT®) can be advantageously used with the adaptive workload method as discussed above. This publicly available tool is a lightweight expert system that helps to identify the main performance inhibitors in Java® systems.

Referring to FIG. 7, the process begins at step 732 by accessing the outside evaluation tool 122. In the case of IBM's WAIT® tool, this can be as simple as entering a web address to serve a web page. In step 734 the diagnosis policy 120 provides the data to be evaluated, such as by uploading it to the website (wait.ibm.com) directly from the web page. The diagnosis policy 120 may provide all of the collected monitoring data 105, or only a portion of the collected monitoring data 105, to the supplementary diagnostic tool 122. The amount to provide may be limited by the tool's 122 usage requirements.

In step 736 the diagnosis policy 120 receives the evaluation results from the supplementary diagnostic tool 122. The results can be in the form of a report with the findings ranked by frequency and impact. In optional step 738, the diagnosis policy 120 is configured to filter the report so that only the most egregious problems receive the attention of the adjustment policy 125. This process can be repeated multiple times to monitor a system 190 through time. A diagnosis policy 120 might exploit the outputs of a supplementary resource 122 such as WAIT® to identify the transactions which are involved in the functionality which is experiencing bottlenecks (e.g. CPU, I/O latency, or deadlock). Then, those transactions can be marked as suspicious, invoking the adjustment policy 125.

Combination Diagnosis and Adjustment Policy—FIG. 8

In one embodiment, the diagnosis policy 120 and the adjustment policy 125 are combined into one script, file, or table. FIG. 8 shows a non-limiting example of a look-up table 800 combining both the diagnosis and adjustment policies. Table 800 stores various transactions/functions 802 that may be of interest to a tester in diagnosing performance issues. Associated with each transaction/function 802 are multiple applicable APMs 106, such as response time and throughput. For each APM 106, the table 800 states a performance goal 810 which can be formulated as a business rule tied to a SLA. For example, assume the SLA mandates a maximum login response time of 1900 ms. This information is included in table 800 as the performance goal 810 for login response time (maximum 1900 ms). A recorded login response time (or an average login response time) over 1900 ms triggers an associated workload adjustment action 820. Referencing table 800, in this example the adaptive workload processor 150 triggers an increase to the workload 140 by 150 users, up to a maximum of 750 users.

Figure 9:
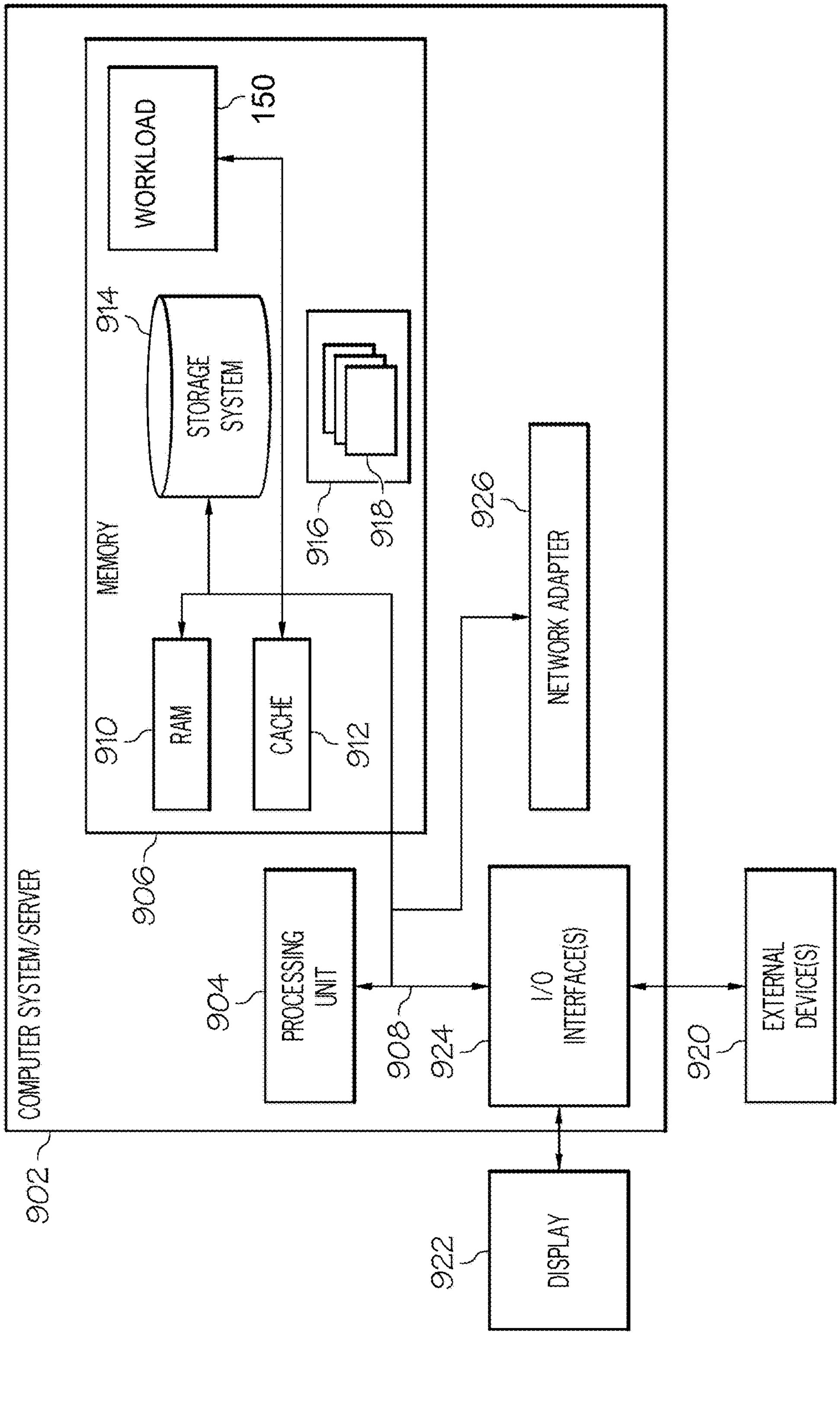
FIG. 9 is a block diagram illustrating a detailed view of an information processing system according to one embodiment of the present disclosure.

Information Processing System Example—FIG. 9

FIG. 9 illustrates one example of an information processing system 902 that can be utilized in various embodiments of the present disclosure. The information processing system 902 shown in FIG. 9 is only one example of a suitable system and is not intended to limit the scope of use or functionality of embodiments of the present disclosure described above. The information processing system 902 of FIG. 9 is capable of implementing and/or performing any of the functionality set forth above. Any suitably configured processing system can be used as the information processing system 902 in embodiments of the present disclosure.

The information processing system 902 is operational with numerous other general purpose or special purpose computing system environments or configurations. Examples of well-known computing systems, environments, and/or configurations that may be suitable for use with the information processing system 902 include, yet limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The information processing system 902 may be described in the general context of computer system-executable instructions, such as program modules, being executed by a computer system. Generally, program modules may include routines, programs, objects, components, logic, data structures, and so on that perform particular tasks or implement particular abstract data types. The information processing system 902 may be practiced in various computing environments such as conventional and distributed cloud computing environments where tasks are performed by remote processing devices that are linked through a communications network. In a distributed cloud computing environment, program modules may be located in both local and remote computer system storage media including memory storage devices.

As illustrated in FIG. 9, the information processing system 902 is in the form of a general-purpose computing device. The components of the information processing system 902 can include, although are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 906, in one embodiment, includes the adaptive workload processor 150 and its components discussed above. Even though FIG. 9 shows the adaptive workload processor 150 residing in the main memory, the adaptive workload processor 150 or at least one of its components can reside within the processor 904, be a separate hardware component, and/or be distributed across a plurality of information processing systems and/or processors.

The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present disclosure.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of embodiments of the present disclosure.

The information processing system 902 can also communicate with one or more external devices 920 such as a keyboard, a pointing device, a display 922, etc.; one or more devices that enable a user to interact with the information processing system 902; and/or any devices (e.g., network card, modem, etc.) that enable computer system/server 902 to communicate with one or more other computing devices. Such communication can occur via I/O interfaces 924. The information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, yet are not limited to: microcode, device drivers, redundant processing units, external disk drive arrays, RAID systems, tape drives, and data archival storage systems.

Figure 10:
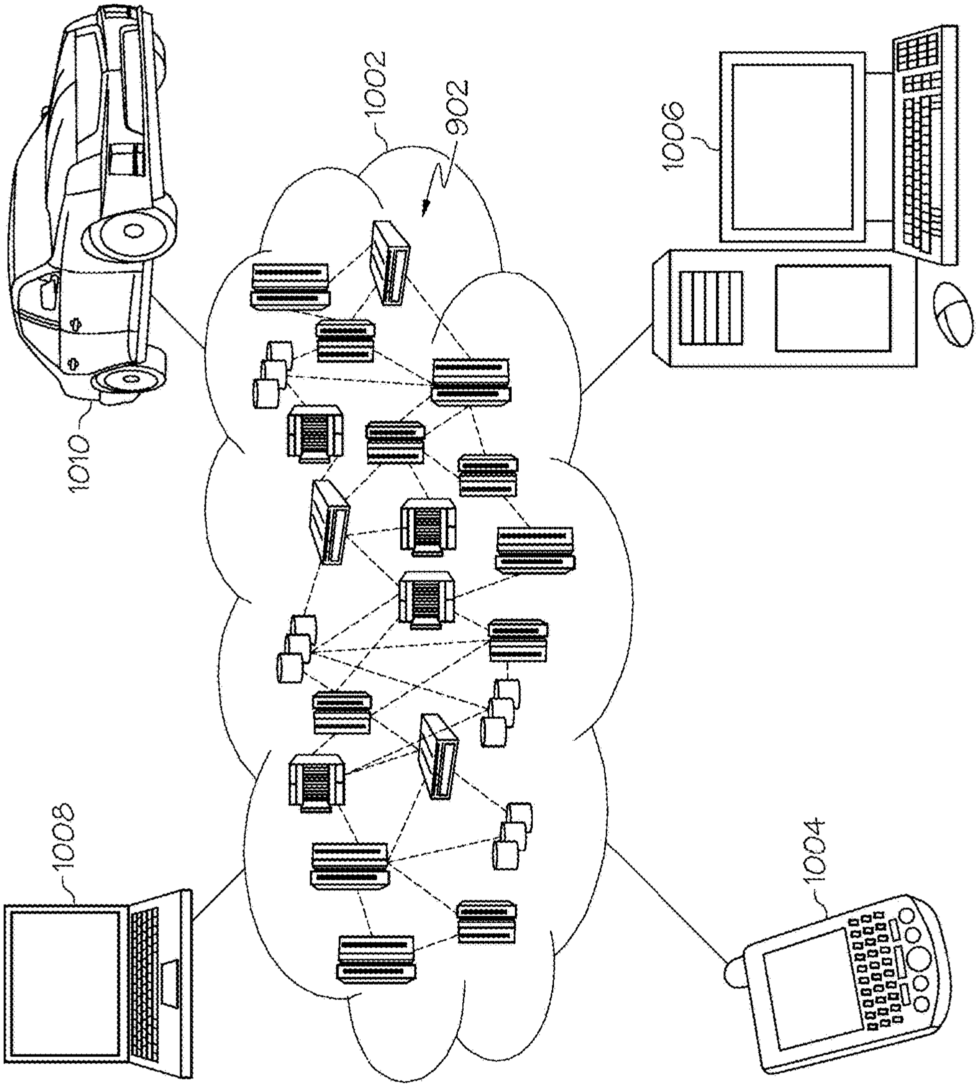
FIG. 10 illustrates one example of a cloud computing environment according to one example of the present disclosure.

Cloud Computing Environment—FIG. 10

It is understood in advance that although the following is a detailed discussion on cloud computing, implementation of the teachings recited herein are not limited to a cloud computing environment. Rather, various embodiments of the present disclosure are capable of being implemented in conjunction with any other type of computing environment now known or later developed. For example, various embodiments of the present disclosure are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present disclosure are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources; however, may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, yet has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure yet has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or by a third party, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities yet are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, illustrative cloud computing environment 1002 is depicted. As shown, cloud computing environment 1002 includes one or more information processing systems 902 with which local computing devices used by cloud consumers, such as, for example, personal digital assistant (PDA) or cellular telephone 1004, desktop computer 1006, laptop computer 1008, and/or automobile computer system 1010 may communicate. Each node within the environment 1002 may communicate with one another. They may be grouped (not shown) physically or virtually, in one or more networks, such as Private, Community, Public, or Hybrid clouds as described hereinabove, or a combination thereof. This allows cloud computing environment 1002 to offer infrastructure, platforms and/or software as services for which a cloud consumer does not need to maintain resources on a local computing device. It is understood that the types of computing devices 1004, 1006, 1008, 1010 shown in FIG. 10 are intended to be illustrative only and that computing nodes 902 and cloud computing environment 1002 can communicate with any type of computerized device over any type of network and/or network addressable connection (e.g., using a web browser).

Figure 11:
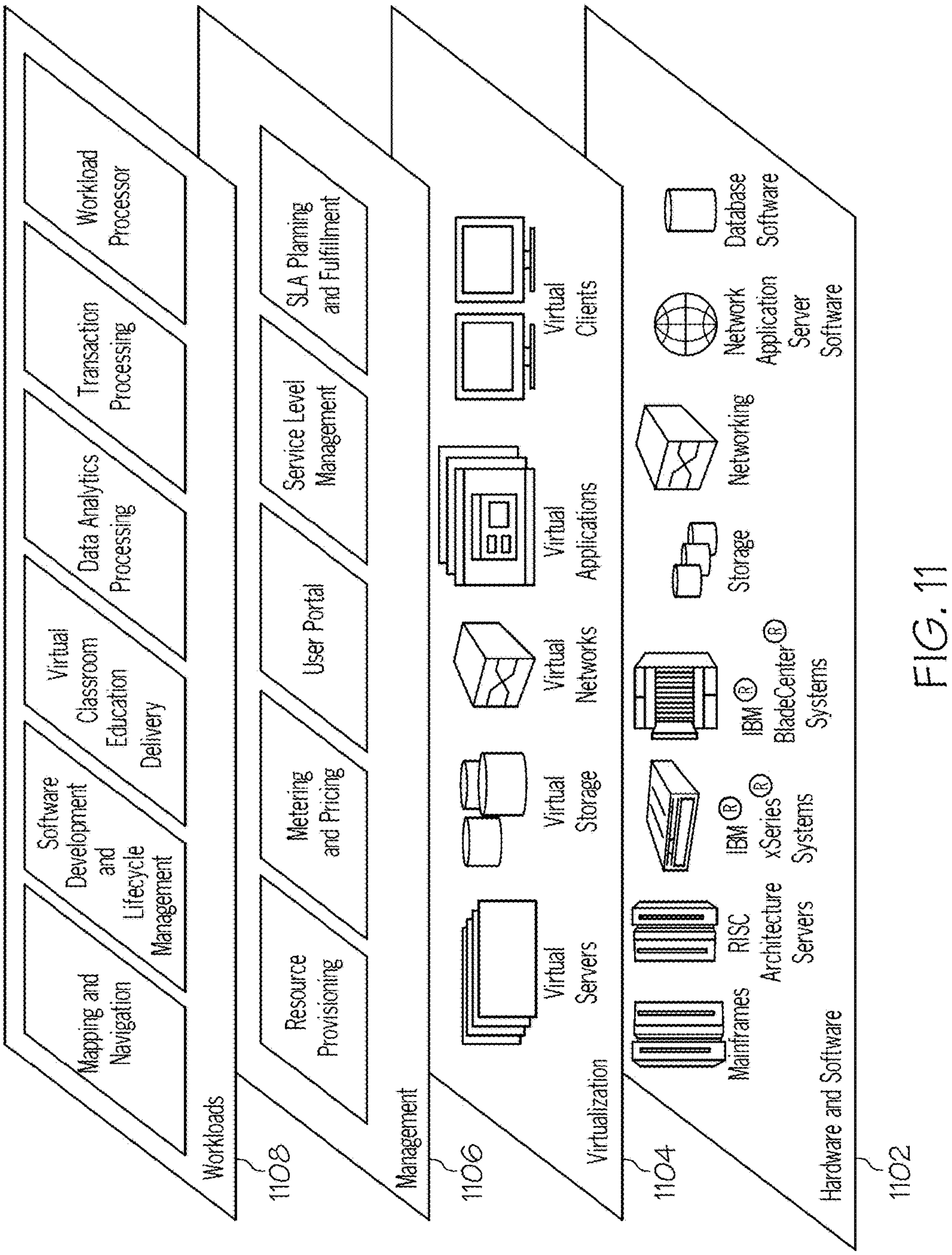
FIG. 11 illustrates abstraction model layers according to one example of the present disclosure.

Referring now to FIG. 11, a set of functional abstraction layers provided by cloud computing environment 1002 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1102 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload processing.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including although not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof.

The description of the present disclosure has been presented for purposes of illustration and description, however it is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for dynamically adapting a workload to expose performance issues, comprising:

using a processor device operably coupled with a memory, performing:

A) prior to a test run:

initializing a diagnosis policy comprising evaluation criteria used to assess performance of a system under test, the system comprising a plurality of applications with associated transactions; and initializing an adjustment policy comprising rules for dynamically adjusting the workload for an identified transaction at run-time during the test run, wherein dynamically adjusting the workload comprises selectively re-tasking virtual users from a workload pool to stress functionality of the identified transaction; and B) parallel to the test run, performing at pre-determined intervals during the test run:

collecting monitoring data for a pre-determined period of time;

applying the evaluation criteria from the diagnosis policy to the collected monitoring data to assess current system performance;

based upon identification of a current system performance issue after the applying, performing:

identifying a transaction associated with the current system performance issue;

matching the identified transaction associated with the current system performance issue with the rules associated with the identified transaction as set out in the adjustment policy; and applying the rules from the adjustment policy to the identified transaction, thereby selectively adjusting the workload by increasing the workload in real-time for the identified transaction while decreasing the workload for other transactions not exhibiting a performance issue; and storing the collected monitoring data.

2. The computer-implemented method of claim 1 wherein increasing the workload comprises increasing a number of virtual users tasked with running the identified transaction.

3. The computer-implemented method of claim 1 wherein initializing the diagnosis policy comprises specifying an outside evaluation tool to assess the performance.

4. The computer-implemented method of claim 1 wherein initializing the diagnosis policy comprises submitting application-dependent evaluation criteria targeted to measuring application performance metrics of a specific application under test.

5. The computer-implemented method of claim 1 wherein initializing the adjustment policy comprises providing: an initial workload, a maximum workload, and a delta workload indicating how many additional virtual users to add to stress functionality of the identified transaction, without exceeding the maximum workload.

6. The computer-implemented method of claim 5 wherein the delta workload specifies a percentage amount.

7. The computer-implemented method of claim 5 further comprising setting a period of time before an increased workload reverts to its initialized state specified as the initial workload in the adjustment policy.

8. The computer-implemented method of claim 1 wherein initializing the diagnosis policy comprises providing a set of application performance metrics and associated application performance thresholds, and identifying a test tool used to provide the set of application performance metrics.

9. The computer-implemented method of claim 8 wherein the set of application performance metrics comprise at least one of: throughput, response time, and cpu utilization rate.

10. An information processing system for adaptive workload adjustment of a system under test, the information processing system comprising:

a memory;

a processor device communicatively coupled to the memory, the processor device performing a method comprising:

A) prior to a test run:

initializing a diagnosis policy comprising evaluation criteria used to assess performance of the system under test, the system comprising a plurality of applications with associated transactions; and initializing an adjustment policy comprising rules for dynamically adjusting a workload for an identified transaction at run-time during the test run, wherein dynamically adjusting the workload comprises selectively re-tasking virtual users from a workload pool to stress functionality of the identified transaction; and B) parallel to the test run, performing at pre-determined intervals during the test run:

collecting monitoring data for a pre-determined period of time;

applying the evaluation criteria from the diagnosis policy to the collected monitoring data to assess current system performance;

based upon identification of a current system performance issue after the applying, performing:

identifying a transaction associated with the current system performance issue;

matching the transaction associated with the current system performance issue with the rules associated with the identified transaction as set out in the adjustment policy; and applying the rules from the adjustment policy to the identified transaction, thereby selectively adjusting the workload by increasing the workload in real-time for the identified transaction, while decreasing the workload for other transactions not exhibiting a performance issue; and storing the collected monitoring data.

11. The information processing system of claim 10 wherein the diagnosis policy specifies an outside evaluation tool to perform a diagnosis on the collected monitoring data.

12. The information processing system of claim 10 wherein initializing the adjustment policy comprises providing: an initial workload, a maximum workload, and a delta workload indicating how many additional virtual users to add to stress functionality of the identified transaction, without exceeding the maximum workload; and wherein the method further comprises setting a period of time before an adjusted workload reverts to its initialized state specified as the initial workload in the adjustment policy.

13. The information processing system of claim 10 wherein initializing the diagnosis policy comprises submitting application-dependent evaluation criteria targeted to measuring application performance metrics of a specific application under test and the application performance metrics comprise at least one of: throughput, response time, and cpu utilization rate.

14. A computer program product for adaptive workload adjustment, the computer program product comprising:

a non-transitory computer readable storage medium readable by a processing circuit and storing instructions for execution by the processing circuit performing a method comprising:

A) prior to a test run:

initializing a diagnosis policy comprising evaluation criteria used to assess performance of a system under test, the system comprising a plurality of applications with associated transactions; and initializing an adjustment policy comprising rules for dynamically adapting a test workload for an identified transaction at run-time during the test run, wherein dynamically adjusting the test workload comprises selectively re-tasking virtual users from a workload pool to stress functionality of the identified transaction; and B) parallel to the test run, performing at pre-determined intervals during the test run:

collecting monitoring data for a pre-determined period of time;

applying the evaluation criteria from the diagnosis policy to the collected monitoring data to assess current system performance;

based upon identification of a current system performance issue after the applying, performing:

identifying a transaction associated with the current system performance issue;

matching the identified transaction associated with the current system performance issue with the rules associated with the identified transaction as set out in the adjustment policy; and applying the rules from the adjustment policy to the identified transaction, thereby selectively adjusting the workload by increasing the workload in real-time for the identified transaction, while decreasing the workload for another transaction not exhibiting a performance issue; and storing the collected monitoring data.

15. The computer program product of claim 14 wherein increasing the workload comprises increasing a number of virtual users tasked with running the identified transaction.

16. The computer program product of claim 15 further comprising using an outside evaluation tool specified in the diagnosis policy for performing a diagnosis on the collected monitoring data.

17. The computer program product of claim 14 further comprising setting a period of time before an increased workload reverts to its initialized state specified as an initial workload in the adjustment policy.

* * * * *